Dec. 19, 1922.  
F. O. FARWELL.  
COMBINATION MOTOR AND METHOD OF OPERATING THE SAME.  
FILED MAR. 1, 1919.

Inventor  
F. O. Farwell  
By Chas. J. O'Neill  
Attorney

Dec. 19, 1922.
F. O. FARWELL.
COMBINATION MOTOR AND METHOD OF OPERATING THE SAME.
FILED MAR. 1, 1919.
1,439,079.
5 SHEETS—SHEET 4.
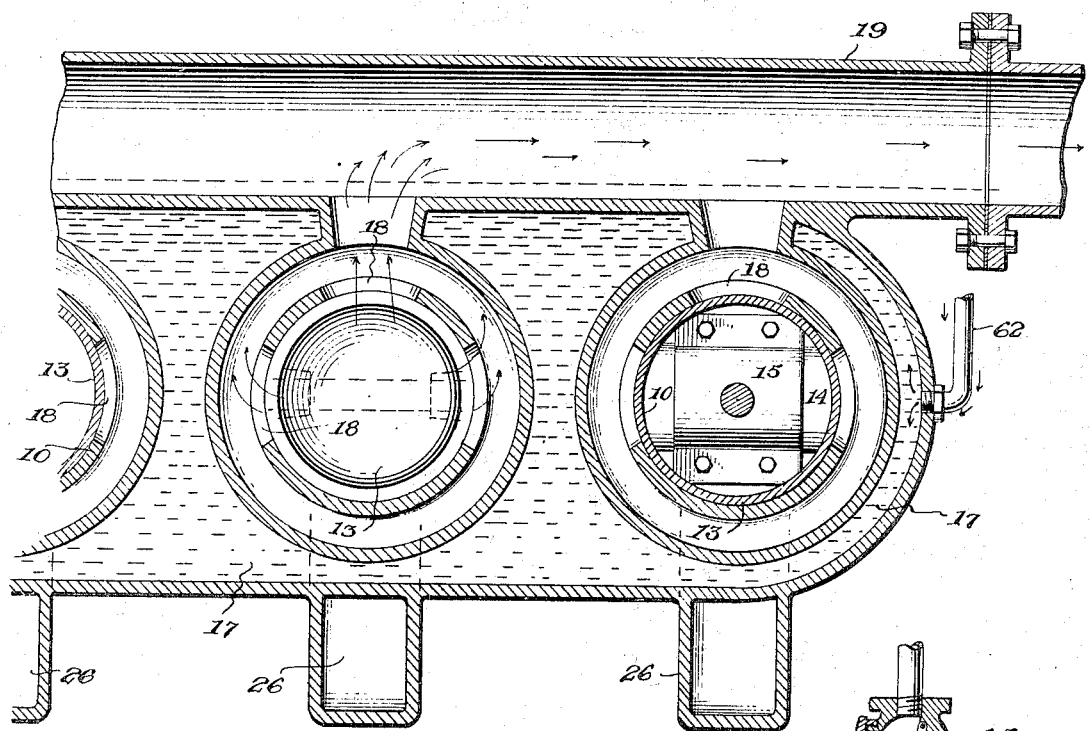
Fig. 5.
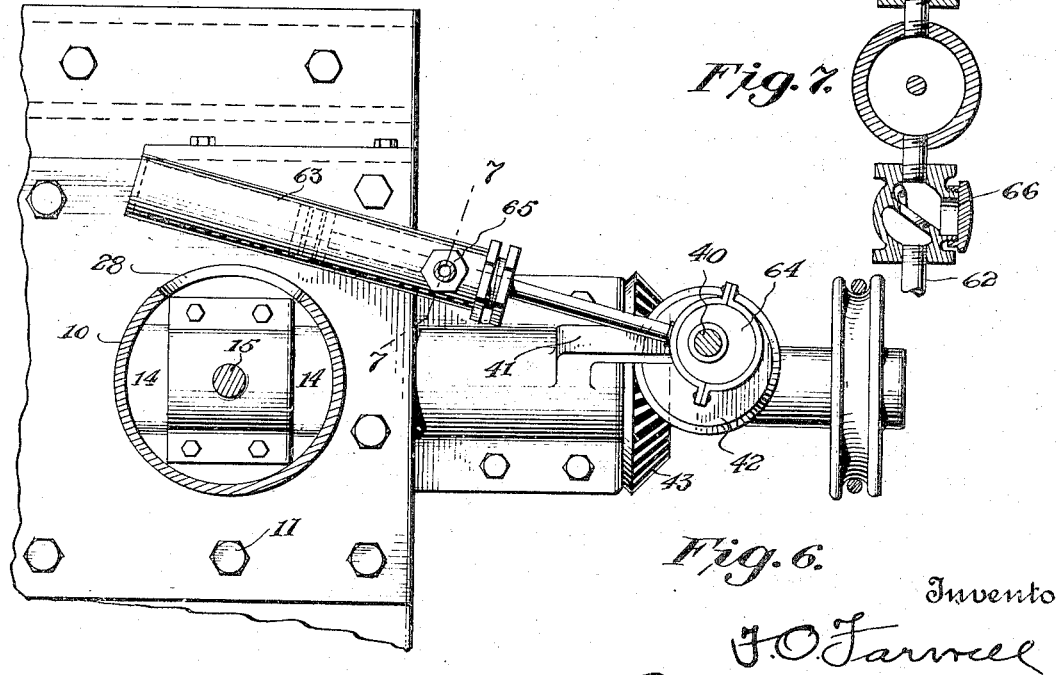
Fig. 7.
Fig. 6.
Inventor
F. O. Farwell
By Chas. J. O'Neill
Attorney Patented Dec. 19, 1922.

1,439,079

UNITED STATES PATENT OFFICE.

FAY O. FARWELL, OF DUBUQUE, IOWA.

COMBINATION MOTOR AND METHOD OF OPERATING THE SAME.

Application filed March 1, 1919. Serial No. 280,037.

*To all whom it may concern:*

Be it known that I, FAY O. FARWELL, a citizen of the United States, residing at Dubuque, in the county of Dubuque and State of Iowa, have invented certain new and useful Improvements in Combination Motors and Methods of Operating the Same; and I do hereby declare the following to be a full, clear, and exact description of the invention, such as will enable others skilled in the art to which it appertains to make and use the same.

This invention relates to a combination motor and method of operating the same.

An object in the invention resides in the construction of a motor, in such manner, that the maximum amount of heat, which is wasted in the present types of motors, may be used to increase the efficiency to the maximum. Furthermore, it is an object of this invention to provide a motor which will produce a more constant and uniform torque on the crank shaft.

A further object of the invention resides in the provision of a motor wherein the fuel will be utilized with the maximum efficiency even when a small percentage of the total power out-put is used.

A still further object of the invention resides in the method of operating a motor, whereby one impulse will be given to the crank shaft upon each movement of the piston outwardly of the cylinder and wherein the impulses will be alternately produced by the expansion of gases and of steam.

In the drawing:

Fig. 5 is a horizontal sectional view showing the exhaust system;

Fig. 6 is a horizontal sectional view disclosing the water pump;

Fig. 7 is a vertical sectional view on line 7—7 of Fig. 6;

Figure 1:
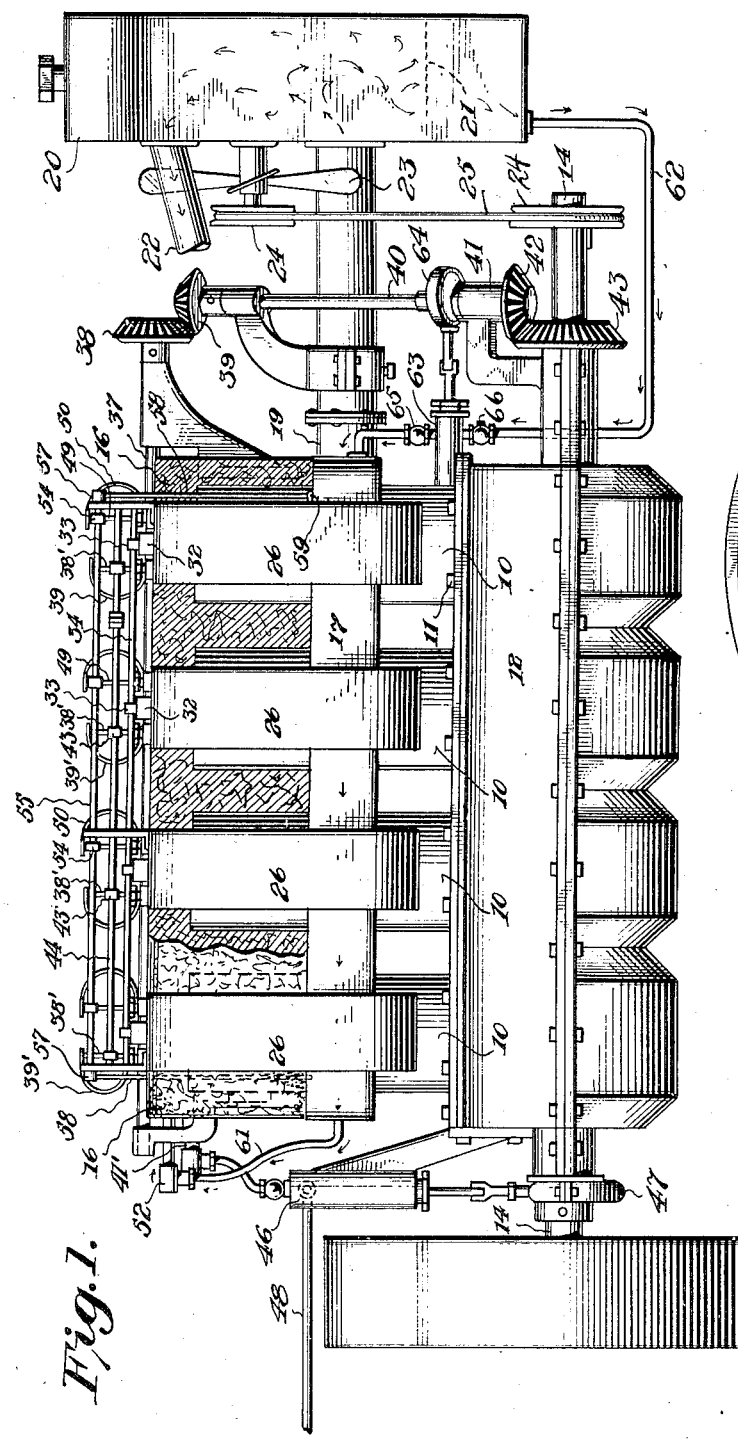
Fig. 1 is a side elevation of a motor constructed in accordance with my invention.

The embodiment of the invention illustrated in the drawing includes a series of cylinders 10 which are secured by suitable fasteners 11 to the upper half of a crank case 12, which case is made in two parts for the sake of convenience. In each of the cylinders 10 a piston 13 is operable, which piston is, as will be observed from the drawing, considerably longer than the ordinary internal combustion engine piston, for a purpose which will later appear. Each of these pistons is connected to a crank shaft 14, which is located in the case 12, by a connecting rod 15. The cylinders are jacketed almost entirely by a non-conducting material 16, so that the heat generated by the explosion of the gases in the cylinders will not radiate. However, each of the cylinders is water jacketed at 17, adjacent to the exhaust port which will later be described. The purpose of this water jacketing is to prevent the local heating of the cylinder walls, and the consequent distortion of the same. It should not be supposed, however, that the water jackets materially cool the cylinders as a whole. They are not intended for this purpose, but only to reduce the temperature adjacent to the exhaust ports.

Figure 2:
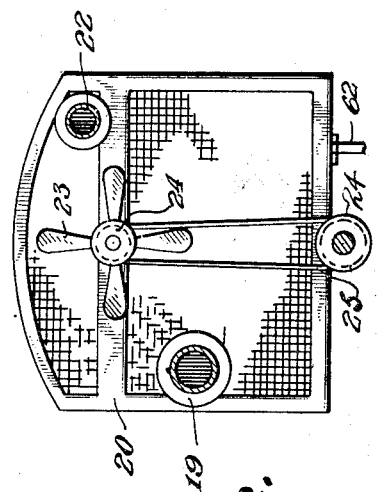
Fig. 2 is a sectional view looking at the rear of the radiator and condenser.
Figure 3:
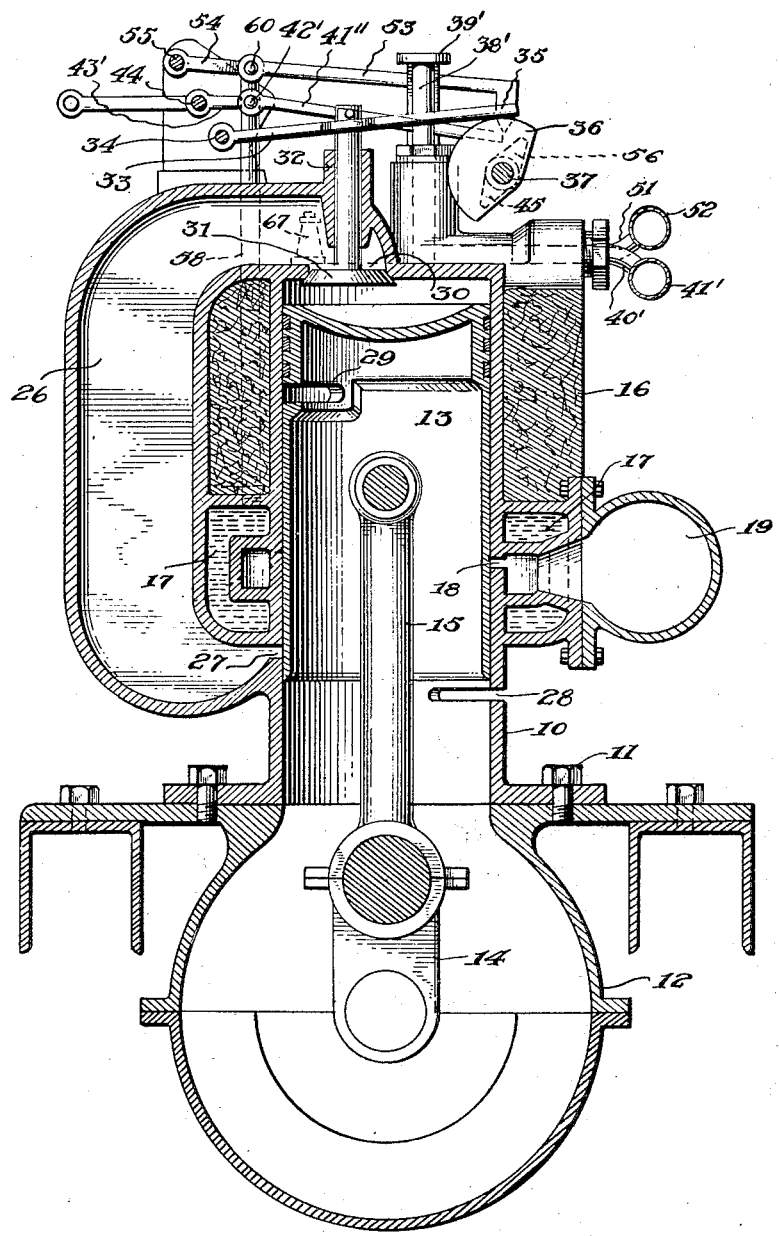
Fig. 3 is a vertical sectional view with the piston in the position it will occupy at the end of one of its inward strokes.

The exhaust ports above referred to extend completely around the cylinders and are indicated in the drawing by the reference character 18. These exhaust ports are connected to the exhaust manifold 19, which extends forwardly to a combined radiator and condenser 20. As is illustrated in Fig. 2 of the drawing, the exhaust enters the radiator and condenser 20 at a point between the top and bottom thereof, so that it will open above the water line 21, which is maintained in the radiator and condenser 20. The exhaust gases, after being deprived of the water pass through an outlet duct 22 and escape into the atmosphere. The radiator and condenser is cooled by a power driven fan 23, which is actuated through a pair of pulleys 24 and a belt 25.

Adjacent to each of the cylinders 10 is an air chamber 26, which has communication with the crank case 12 through a port 27, the only communication between the atmosphere and the crank case being through an inlet port 28, which is formed in the lower part of the cylinder 10. Each of the pistons 13 is provided with a port 29, which is adapted to register with the adjacent port 27, so that communication is alternately established and broken between the chamber 26 and the crank case 12. This air chamber 26 opens into the upper end of the adjacent cylinder 10 at 30, but the flow of air from the chamber 26 to the cylinder is controlled by a puppet valve 31, which is mounted in a suitable bearing 32 above the cylinder head. This puppet valve 31 is normally maintained in a closed position by a resilient controlling lever 33 which is pivoted on a rod 34 at one of its ends and the other end 35 of which rests on a cam 36, which is carried by a cam shaft 37. This cam shaft is provided on one of its ends with a beveled gear 38, which meshes with a pinion 39 carried by a shaft 40. This shaft 40 is supported in a bearing 41 and at its lower end is provided with a second pinion 42, which meshes with a beveled gear 43 on the crank shaft 14. The relation of these pinions and gears is such that the cam shaft makes one revolution during each two revolutions of the crank shaft.

In order that the cylinders may be provided with fuel, I have provided a valve 38' in the head of each cylinder, which is normally held seated by a C-spring 39', and which controls the flow of the fuel through a supply pipe 40', which connects to the fuel manifold 41'. Each of these valves is unseated against the action of the spring 39', by a lever 41'', which is fulcrumed at 42' to a second lever 43', which is pivoted on a rod 44. These levers 41'' extend to and rest upon cams 45 which are mounted on the cam shaft 37. Thus, upon the revolution of the cam shaft the cams will successively actuate the fuel intake valves 38' and will open the same so as to permit the fuel to be injected into the cylinders. The lever 43' may be controlled, that is to say, it may be moved about its pivot, either by hand or by any suitable method, and when it is moved the fulcrum 42' of the lever 41'' will either be raised or lowered and consequently the time during which the valve 38' remains open will be varied thereby. Thus the speed of the motor will be controlled. The fuel manifold 41' extends from a pump 46, which is actuated by an accentric 47 from the crank shaft 14, the pump being supplied with fuel through a pipe 48.

A water inlet valve 49 is located in the head of each of the cylinders 10, and is normally held closed by a C-spring 50. This valve 49 controls the injection of water into the cylinder through a pipe 51. The pipes 51 which extend from the cylinders are connected to a water-manifold 52, which receives its water in a manner which will later be described.

The water valve 49 is opened against the action of the spring 50 by a lever 53, which is pivoted to an arm 54, which in turn is secured to a rod 55. The free end of this lever 53 is adapted to engage a cam 56, which is mounted on the cam shaft 37 and thus raise the water inlet valve 49 against the action of the spring 50. Of course, when the motor is relatively cold, only a small amount of water can be vaporized, but as the temperature increases the motor is capable of vaporizing greater quantities of water. It is, of course, desirable that not too much water be injected into the cylinder, since all of the water which would not be turned to steam would have a detrimental effect, and yet on the other hand, it is desirable that sufficient water be injected to insure the maintenance of the temperature at such a point that the safety will be insured. Therefore, in order that the amount of water may be automatically controlled by the temperature existing in the cylinders, I have provided the rod 55 with a crank arm 57 to which a thermostatic rod 58 is secured, which rod extends downwardly through the non-heat conducting jacket 16 and is secured at 59 to the cylinder casting. Thus, the expansion and contraction of this rod will cause the raising and lowering of the pivot point 60 of the lever 53 and consequently the lowering and raising of the free end of the lever, owing to its engagement with the water inlet valve 49. Thus, when the engine is comparatively cool the rod will be at its minimum length and the pivot point 60 will be lowered, so that the free end of the lever 53 will be raised, and the time of contact between the lever and the cam 56 will be comparatively short. When however, the temperature of the motor increases the rod expands and raises the pivot point 60, consequently lowering the free end of the lever 53 and increasing the period of contact between the lever and the cam, and as a result, increasing the period during which the water inlet valve 49 is open.

As has been stated, the valves 49 are supplied with water from a manifold 52. This manifold is connected by a duct 61, with the water jacket 17, which has previously been described, and this water jacket is connected to the lower end of the radiator and condenser 20 by a pipe 62, in which is interpolated a pump 63, the pump being actuated by an eccentric 64 on the shaft 40, and the flow of water being controlled by check valves 65 and 66.

In the head of each cylinder 10 a spark plug 67 is inserted, which spark plugs may be used in starting, or if desired, in connection with a suitable ignition system, for exploding the gaseous mixtures in the cylinders.

Figure 4:
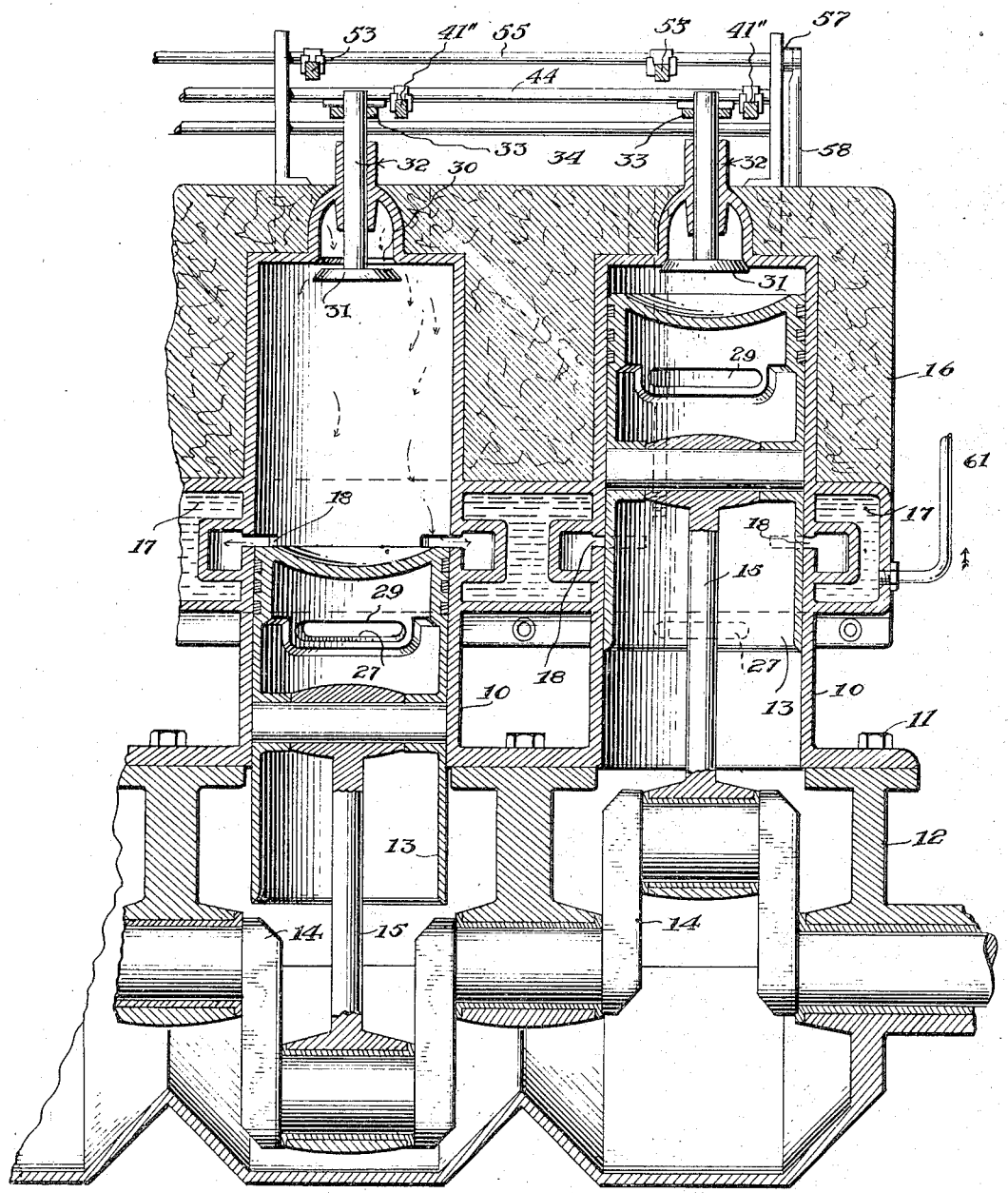
Fig. 4 is a vertical sectional view taken at right angles to Fig. 3, showing one of the pistons at the end of its outward stroke, and another at the end of its inward stroke.
Figure 10:
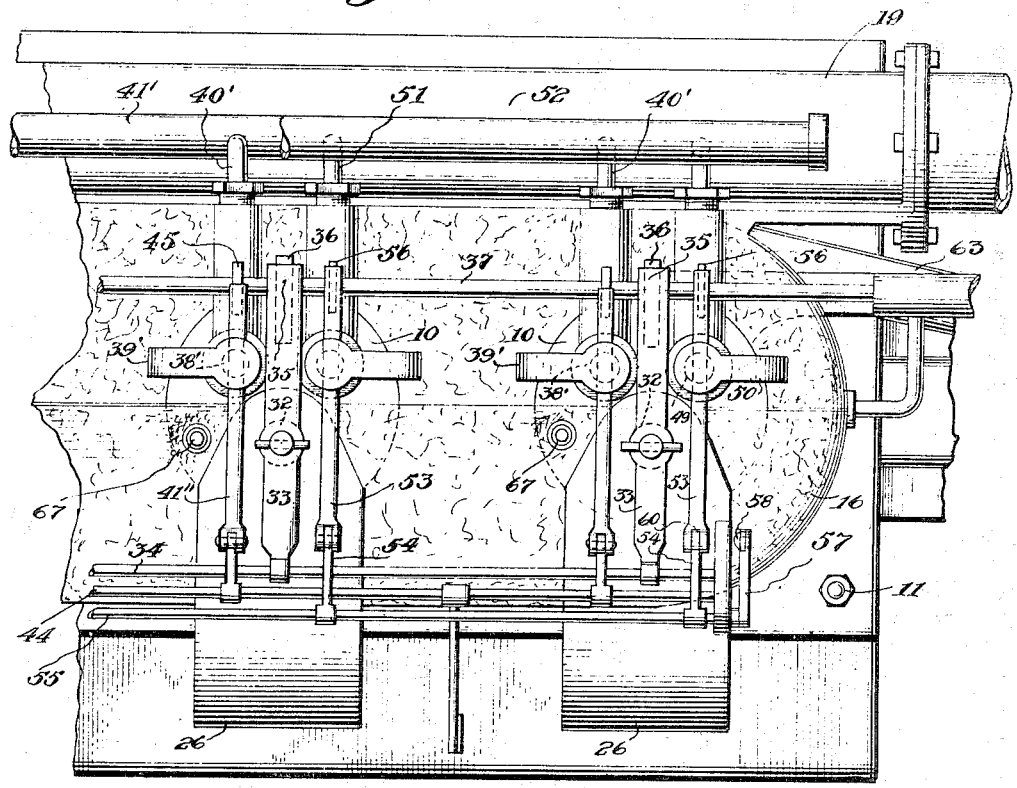
Fig. 10 is a fragmental plan view.
Figure 8:
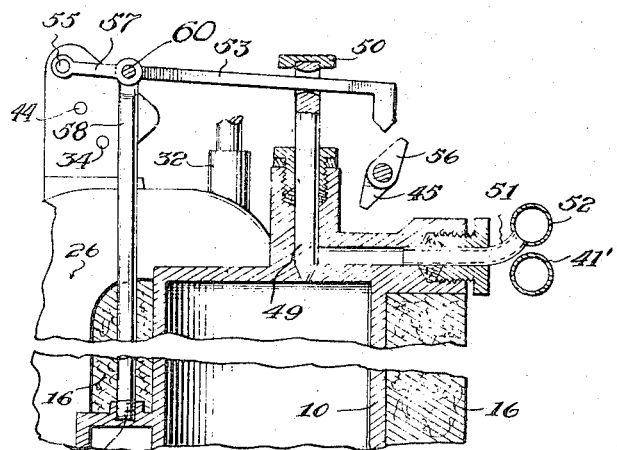
Fig. 8 is a fragmental vertical sectional view showing the thermostat for controlling the water injector.
Figure 9:
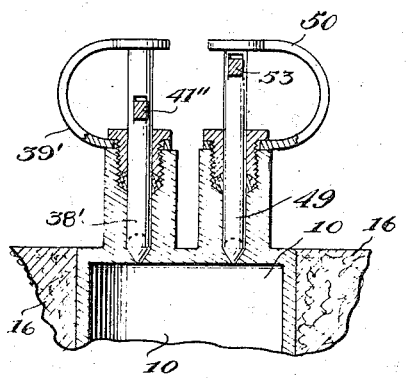
Fig. 9 is a view taken at right angles to Fig. 8, disclosing the disposition of the water and fuel injectors.

In operation, assuming that the piston at the right hand of Fig. 4 is at the end of its inward air-compressing stroke, the fuel inlet valve 38' will be open so as to allow sufficient fuel to be injected into the compressed and consequently heated air to cause an explosion, or to form a gaseous mixture which will explode upon the sparking of the plug 67. When the piston is in this position the air inlet port 28 in the cylinder will be open and the air will have free access to the crank case. Upon the outward movement of the piston 13, the port 28 will be closed by the piston and the air in the crank case compressed until the port 29 in the piston alines with the port 27 in the chamber 26, at which time the compressed air will flow into the chamber 26 and fill the same. At the end of the outward stroke of the piston 13, the exhaust port 18 will be opened and a portion of the gases will be permitted to escape into the exhaust manifold 19, the escape, however, being due to their expansion and not to any external applied force. The major portion of the burnt gases remains in the cylinder and upon the next inward stroke of the piston the gases are compressed, and consequently the temperature of the gases is raised. On the beginning of the outward stroke of the piston the water valve 49 is opened so that water is injected into the cylinder in atomized form and is turned to steam during the compression of the burnt gases. The piston is then moved outwardly on the second power stroke by the expansion of the steam. When the piston approaches the end of this outward stroke the cam 36 will be in such a position that the lever 33 will permit the opening of the valve 31. This valve will be opened by the pressure of air in the chamber 26 and the air compressed in the crank case, and the air will pass through the cylinder and out through the exhaust manifold 19, carrying with it the burnt gases and the water vapor. The quantity of air which is injected into the cylinder is sufficient to thoroughly scavenge the cylinder and to supply it with an abundance of air to be compressed upon the next upward stroke of the piston.

The burnt gases and steam which are forced through the manifold 19 pass through the muffler and condenser 20, the steam being condensed and the water of condensation accumulating in the bottom of the condenser. The gases pass outwardly through the exhaust pipe 22 and escape into the atmosphere. Thus the water which is supplied to the cylinders is first heated in the water jacket 17 and is then returned to the water supply in the condenser and from the condenser furnished to the water jacket, so that the loss of water will be reduced to a minimum and the engine will thereby be made practical, not only in connection with stationary work, but also in connection with automobile work.

The method of operating the motor consists in compressing air within the cylinder during which compression the air is, of course, heated. At the end of the air compression stroke the fuel is injected into the compressed and heated air and will form an explosion mixture with the air, which mixture will be ignited because of the temperature of the compressed air. The piston in its outward or power stroke will act to compress a quantity of air, which upon the first inward stroke of the piston will flow to a storage place for subsequent use. Near the end of the first power stroke of the piston, that is to say, the stroke which results from the explosion of the gases, a portion of the burnt gases is exhausted from the cylinder and that portion which remains, which as a matter of fact is the major portion, is compressed in the cylinder and as a result, its temperature is raised. During this compression stroke a spray of water is injected into the cylinder and because of the temperature within the cylinder, forms steam. The expansion of this steam causes a second power stroke of the piston, and near the end of this second power stroke the air which has previously been compressed is admitted to the cylinder and scavenges the burnt gases and steam therefrom. The quantity of compressed air, however, is in excess of that necessary to thoroughly scavenge the cylinder, and is, as a matter of fact sufficient to leave the cylinder full of pure air, which is compressed upon the next inward stroke of the piston and upon the beginning of the next cycle of operations.

The method contemplates more specifically the variation of water injected into the cylinder, so that the water injected will bear a specific relation to the temperature of the cylinder and so that all of the water will be turned to steam and will not cool the cylinder beyond the desired working temperature. The advantage of this variation of the injected water is obvious, for when the motor is relatively cold it will not vaporize as much water as when it warms, and if a constant quantity of water were injected the result would be disastrous.

From the foregoing description of the motor and the method of operating the same, it will be seen that upon the outward stroke of the piston which is caused by the expansion of the gases, a quantity of air will be compressed in the crank case, which air will flow into the storage chamber 26 when the piston arrives at such a position that the port 27 is open. Then upon the next outward stroke of the piston an additional quantity of air will be compressed in the crank case and when the port 27 is again open it will combine with the first compressed quantity and when the combined pressure is greater than the pressure within the cylinder the inlet valve in the head of the cylinder will open and the air will flow through the cylinder and thoroughly scavenge the same, leaving a sufficient quantity of air to be subsequently compressed. It will be seen that by the combination of the two compressed quantities of air an abundance of air will be produced to thoroughly scavenge the cylinder and leave it full of pure air.

In connection with the muffler and condenser 20, it is explained that when the mixture of burnt gases and steam passes through the exhaust pipe 19 to said muffler and condenser the steam will be condensed as has heretofore been pointed out, and the gases will be muffled so that the report of the expansion will not be audible. Of course, it is realized that this muffling action will take place as the gases pass through the passages of the muffler and condenser 20 in their travel from the exhaust pipe 19 to the pipe 22.

What I claim is:—

1. The method of operating a motor which includes a cylinder and piston, which consists in compressing air within the cylinder, injecting fuel into the compressed air to cause an outward stroke of the piston, compressing an auxiliary quantity of air on said outward stroke, exhausting part of the burnt gases at the end of the outward stroke, compressing the remainder of said gases, injecting a spray of water into said compressed gases to form steam whereby a second outward stroke of the piston is produced, and scavenging the cylinder by injecting the previously compressed air into the cylinder at the end of the last mentioned outward stroke.

2. The method of operating a motor which includes a cylinder and piston, which consists in compressing air within the cylinder, injecting fuel into the compressed air to cause an outward stroke of the piston, exhausting part of the burnt gases at the end of said outward stroke, compressing the remainder of said gases, injecting a spray of water into said compressed gases to form steam whereby a second outward stroke of the piston is produced, and scavenging the cylinder by injecting the previously compressed air into the cylinder at the end of the last mentioned outward stroke.

3. The method of operating a motor which includes a cylinder and piston, which consists in compressing air within the cylinder, injecting fuel into the compressed air to cause an outward stroke of the piston, compressing an auxiliary quantity of air on said outward stroke, exhausting part of the burnt gases at the end of said outward stroke, compressing the remainder of said gases, and injecting a spray of water into said compressed gases to form steam whereby a second outward stroke of the piston is produced.

4. In a motor which includes a cylinder, a piston and an air-tight crank case, means for alternately injecting fuel and water into the cylinder, an air storage chamber, the piston being operable to alternately establish communication between the crank case and the atmosphere and between the crank case and the chamber and to compress the air in the crank case, means for establishing communication between the chamber and the cylinder, and means for varying the amount of water injected into the cylinder in proportion to the variation of the temperature of the motor.

5. In a motor which includes a cylinder, a piston and an air-tight crank case, means for alternately injecting fuel and water into the cylinder, an air storage chamber, the piston being operable to alternately establish communication between the crank case and the atmosphere and between the crank case and the chamber and to compress the air in the crank case, means for establishing communication between the chamber and the cylinder, and automatically operable means for varying the amount of water injected into the cylinder in proportion to the variation of the temperature of the motor.

6. In a motor which includes a cylinder, a piston and an air-tight crank case, a fuel injector and a water injector in the cylinder, an air chamber having a port to establish communication between the chamber and the cylinder and a port to establish communication between the chamber and the crank case, a valve for controlling the first mentioned port, the piston being operable to control the second mentioned port, the crank case having a port to establish communication between the atmosphere and the crank case, the piston being operable to close said port upon the opening of the port into the chamber.

7. In a motor which includes a cylinder and a piston, a non-heat conducting jacket surrounding the major portion of the cylinder, a relatively small jacket surrounding a portion of the cylinder, a water injector valve in the cylinder, means connecting the water jacket to the water valve, a muffler and condenser, an exhaust duct extending from the cylinder to said radiator and condenser, and a water conduit extending from muffler and condenser to the water jacket.

8. In a motor which includes a cylinder and a piston, means for alternately injecting fuel and a spray of water into the cylinder, means for maintaining a sufficient temperature in the cylinder to convert the water into steam, and means for condensing the steam.

9. In a motor which includes a cylinder and a piston, means for alternately injecting fuel and a spray of water into the cylinder, means for heating the water before its injection into the cylinder, means for maintaining a sufficient temperature in the cylinder to convert the water into steam, and means for condensing the steam.

10. In a motor which includes a cylinder and a piston, means for alternately injecting fuel and a spray of water into the cylinder, said cylinder having an exhaust port adjacent to its lower end, which port is opened upon the outward movement of the piston, a non-heat conducting jacket surrounding the major portion of the cylinder, and a cooling jacket surrounding the cylinder in the vicinity of the exhaust port.

11. In a motor which includes a cylinder and a piston, a fuel injector valve and a water injector valve in the cylinder, resilient means for normally maintaining said valves seated, levers operatively connected to the valves and cooperating with cams to unseat the valves, and means for varying the period of contact between the levers and the cams.

12. In a motor which includes a cylinder and a piston, fuel and water injector valves in the cylinder, an air storage chamber, the piston being operable to supply said chamber with compressed air, and cam controlled means for permitting the periodic flow of compressed air from the chamber into the cylinder.

In testimony whereof I affix my signature.

FAY O. FARWELL.